US010287410B2

(12) United States Patent
Pineau et al.

(10) Patent No.: US 10,287,410 B2
(45) Date of Patent: May 14, 2019

(54) METHOD FOR IMPREGNATING NATURAL FIBRES WITH A POLYMER IN AQUEOUS DISPERSION AND USE OF SAID FIBRES IN COMPOSITE MATERIALS

(71) Applicants: ARKEMA FRANCE, Colombes (FR); DEHONDT TECHNOLOGIES, Notre Dame de Gravenchon (FR)

(72) Inventors: Quentin Pineau, Evreux (FR); Gilles Hochstetter, L'Hay les Roses (FR); Marc Audenaert, Bernay (FR); Guy Dehondt, Auberville la Campagne (FR); Edouard Philippe, Le Havre (FR)

(73) Assignees: AKREMA FRANCE, Colombes (FR); DEHONDT TECHNOLOGIES, Notre Dame de Gravenchon (FR)

(*) Notice: Subject to any disclaimer, the term of this patent is extended or adjusted under 35 U.S.C. 154(b) by 41 days.

(21) Appl. No.: 15/310,463

(22) PCT Filed: May 7, 2015

(86) PCT No.: PCT/FR2015/051218
§ 371 (c)(1),
(2) Date: Nov. 11, 2016

(87) PCT Pub. No.: WO2015/173496
PCT Pub. Date: Nov. 19, 2015

(65) Prior Publication Data
US 2017/0073484 A1 Mar. 16, 2017

(30) Foreign Application Priority Data
May 12, 2014 (FR) .................. 14 54210

(51) Int. Cl.
C08J 5/24 (2006.01)
B29B 15/12 (2006.01)
D06M 15/227 (2006.01)
D06M 15/263 (2006.01)
D06M 15/277 (2006.01)
D06M 15/507 (2006.01)
D06M 15/564 (2006.01)
D06M 15/59 (2006.01)
C08J 5/04 (2006.01)
B29B 13/06 (2006.01)
B29K 77/00 (2006.01)

(52) U.S. Cl.
CPC .............. C08J 5/24 (2013.01); B29B 13/06 (2013.01); B29B 15/12 (2013.01); B29B 15/125 (2013.01); B29B 15/127 (2013.01); C08J 5/045 (2013.01); D06M 15/227 (2013.01); D06M 15/263 (2013.01); D06M 15/277 (2013.01); D06M 15/507 (2013.01); D06M 15/564 (2013.01); D06M 15/59 (2013.01); B29K 2077/00 (2013.01); C08J 2301/02 (2013.01); C08J 2377/06 (2013.01)

(58) Field of Classification Search
CPC .......... C08J 5/24; B29B 15/12; B29B 15/125; B29B 15/127; D06M 15/227; D06M 15/263; D06M 15/277; D06M 15/507; D06M 15/564; D06M 15/59
See application file for complete search history.

(56) References Cited

U.S. PATENT DOCUMENTS

| 4,292,105 A | 9/1981 | Taylor |
| 2002/0176979 A1 | 11/2002 | Evans |
| 2015/0126546 A1 | 5/2015 | Hochstetter et al. |

FOREIGN PATENT DOCUMENTS

| EP | 0 013 244 A1 | 7/1980 |
| EP | 0 324 680 A2 | 7/1989 |
| EP | 1497104 * | 1/2005 |
| FR | 2223173 A1 | 10/1974 |
| FR | 2 781 492 A1 | 1/2000 |
| FR | 2 973 802 A1 | 10/2012 |
| GB | 512 558 | 9/1939 |
| GB | 512558 A | 9/1939 |
| GB | 644648 A | 10/1950 |

(Continued)

OTHER PUBLICATIONS

International Search Report (PCT/ISA/210) dated Jul. 24, 2015, by the European Patent Office as the International Searching Authority for International Application No. PCT/FR2015/051218.
Written Opinion (PCT/ISA/237) dated Jul. 24, 2015, by the European Patent Office as the International Searching Authority for International Application No. PCT/FR2015/051218.
International Search Report (PCT/ISA/210) dated Jul. 23, 2015, by the European Patent Office as the International Searching Authority for International Application No. PCT/FR2015/051220.

(Continued)

Primary Examiner — Edward J Cain
(74) Attorney, Agent, or Firm — Buchanan Ingersoll & Rooney P.C.

(57) ABSTRACT

A method for impregnating strands or strips of natural fibers, using the following successive steps: i) the impregnation of the strands or strips by immersion in a bath containing a fine aqueous polymer dispersion; followed by ii) the drying of the strands or strips using a heating system, with the progressive elimination of the water and the gradual melting of the polymer, and the coating of the strands or strips and the molten polymer incorporated into the core of the strands or strips as a binder between the fibers; iii) optionally, the forming of the treated strands or strips into their final shape; and iv) the cooling of the treated strands or strips. The aqueous polymer dispersion comprises at least one semi-crystalline or amorphous polymer and, in the case of an amorphous polymer, has a Tg varying between 50° C. and 175° C.

22 Claims, 1 Drawing Sheet

(56) References Cited

FOREIGN PATENT DOCUMENTS

| GB | 1 424 168 A | 2/1976 |
|---|---|---|
| WO | WO 03/091006 A2 | 11/2003 |
| WO | WO 2013/176955 A1 | 12/2013 |

OTHER PUBLICATIONS

Written Opinion (PCT/ISA/237) dated Jul. 23, 2015, by the European Patent Office as the International Searching Authority for International Application No. PCT/FR2015/051220.

* cited by examiner

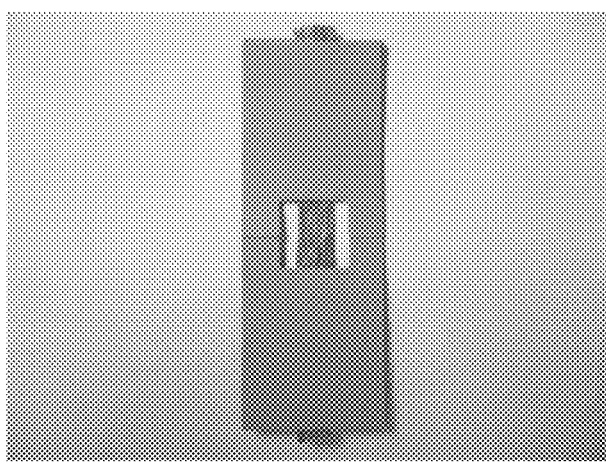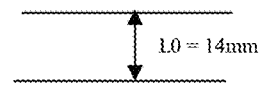

METHOD FOR IMPREGNATING NATURAL FIBRES WITH A POLYMER IN AQUEOUS DISPERSION AND USE OF SAID FIBRES IN COMPOSITE MATERIALS

The invention relates to a process for impregnating rovings or ribbons of natural fibers, in particular flax fibers, with a specific aqueous dispersion of polymer for consolidating the fibers at the core of the fiber bundle and improving their mechanical strength without the need for twisting. The invention also relates to the treated fibers and to the use thereof in composite materials.

Natural fibers such as flax, hemp or sisal fibers, and in particular flax fibers, are not continuous fibers, but are discontinuous fibers linked to one another by transverse fibrils. This fact creates a need to search for a means to reinforce the mechanical strength of the rovings or yarns or ribbons of natural fibers, contrary to the case of glass or carbon fibers which are continuous. For fibers for the textile industry, natural fibers are twisted so as to constitute a yarn which has sufficient mechanical strength for the intended use. The challenge is to obtain this improved mechanical strength of the fiber roving without twisting the fibers. When a natural reinforcement for manufacturing composites is sought, it is sought to preserve as much as possible the intrinsic qualities of natural fibers, in particular of flax fibers, and for this reason, the fibers are not twisted: the fiber rovings, i.e. bundles of natural fibers or ribbons of natural fibers, then consist of fibers for technical use having better mechanical properties than fibers for textile use, since they have not been damaged by the twisting step used to manufacture the fibers for textile use. Consequently, the obtaining of a roving or a ribbon of technical natural fibers sufficiently resistance so as not to be broken during the operations for manufacturing these rovings or ribbons, requires the production of rovings or ribbons of fibers of high grammage expressed in tex, much higher than what is done with glass or carbon fibers. One tex corresponds to a grammage or linear weight (per unit of length) equal to 1 g/km or $10^{-6}$ kg/m. This higher grammage results in unidirectional fibrous reinforcements or nonwovens or wovens that are coarser, comprising imperfections, and thus affecting the final mechanical strength of composites comprising natural fibers such as flax fibers. It is also impossible, with this type of reinforcement based on natural fibers, to produce lightweight sandwich panels comprising skins of natural-fiber composite, in particular flax-fiber composite, of very small thickness. Thus, the purpose of a flax fiber ribbon or roving of lower grammage is to produce composites comprising virtually continuous natural fibers of greater mechanical strength and to produce lightweight sandwich panels comprising composite reinforcements based on technical natural fibers, which have a higher performance level than those produced from textile fibers. Consequently, there is a need for consolidation and reinforcement of said fiber rovings without recourse to twisting of the fibers and while seeking a binder capable of penetrating to the core of the rovings of said fibers in order to bind the fibers to one another with sufficient cohesion to improve the mechanical strength of the roving.

Because of their matrix, thermoplastic composites already have the advantage over thermoset-matrix composites of being recyclable and of being easily processable or in an easy form. The reinforcement with natural fibers adds an additional advantage to the recyclability, which is the plant origin of the fibers: it is an important element to be taken into consideration in the ecological context, where the aim is to use environmentally friendly renewable raw materials. Furthermore, compared to thermoplastic composites with glass fiber reinforcement, thermoplastic composites with fibrous reinforcement of natural origin, in particular based on flax fibers, make it possible to lighten said composites for equivalent performance level. This is because the density of flax fibers (1.5) is approximately 40% lower than that of glass fibers, hence the growing interest in and need to have rovings or ribbons of natural fibers, in particular flax fibers, with consolidation between the fibers of the bundle and improved mechanical strength without twisting.

Application GB 512558 describes the treatment of cotton fibers with a dispersion of rubber or of synthetic resin with a low polymer content ranging from 2% to 10% without the need to twist the cotton yarns for tensile mechanical strength. After impregnation under pressure, the surplus of dispersion is eliminated by pressurized air jet with few polymer particles remaining on the fibers after elimination of the surplus and drying of the fibers. No piece of data on the polymer content remaining between the fibers is specified and no specific examples mentioned regarding the production conditions and regarding the specific results obtained. Even less, said document neither describes the specific problem with natural fibers such as flax fibers, as set out above for the needs of reinforcing thermoplastic matrices of thermoplastic composite materials, nor suggests a specific solution to said problem.

Furthermore, application EP 0324680 describes a process for preparing a reinforced thermoplastic semi-product such as a polypropylene-based material reinforced with glass fibers. According to said document, the wetting of the reinforcing fibers is all the better if the fibers remain in unit form and not in the form of basic rovings or yarns. More particularly, the process described comprises the steps of first preparing an aqueous coating composition comprising a resin divided into small portions and a viscosity-regulating agent and optionally additives, and then of coating one face of a mat of reinforcing fibers dispersed in unit form, with the aqueous coating composition, followed by drying to obtain a semi-product in the form of a sheet and then optionally melting of said resin. No technical problem linked to the natural fibers, such as flax fibers, is mentioned, nor is any solution to this problem suggested in said document, which relates more to that of a semi-product based on a polyolefin reinforced with glass fibers.

FR 2 223 173 also describes a process for preparing sheets or ribbons of fibers impregnated with resin using an aqueous dispersion of resin, in particular thermosetting resin, with dispersion after thickening using a thickener. Once again, the fibers involved are not natural fibers such as flax fibers, and the problem is not set out, nor is the solution thereto suggested. A similar process is described by EP 0013244.

Application WO 03/091006 describes a process for manufacturing a material composed of natural fibers pre-impregnated with organic resin and provided in the form of a solid and flexible yarn or ribbon. The natural fibers include flax, hemp or sisal fibers or fibers of any other fibrous plant.

FR 2781492 describes a thermoplastic composite material comprising fibers of plant origin, such as flax and/or hemp fibers, as fibers incorporated into a thermoplastic polymer in the molten state.

The present invention makes it possible to solve the technical problems set out above with respect to the prior art with a specific process for impregnating rovings or ribbons of natural fibers where this problem arises, this impregnation taking place at the core by means of a specific polymer aqueous dispersion thus making it possible for said polymer to bind the fibers of said rovings or of said ribbons to one another at the core of the fiber bundle, and to consolidate said fibers through this specific impregnation with the fine particles of polymer used after melting. This impregnation can later and directly result in a pre-impregnated fibrous reinforcement, roving or ribbon of low grammage that can be used for the manufacture of composite materials.

The flexibility of the solution of the present invention enables it to be integrated into a continuous production line for said fibrous reinforcement based on natural fibers such as flax fibers, ranging from the treatment of natural fibers from open fields, to the manufacture of a pre-impregnated and calibrated roving or ribbon.

The first subject of the invention relates to a process for impregnating rovings or ribbons of natural fibers, in particular flax fibers, using a specific aqueous polymer dispersion.

The invention also relates to the fibers thus treated, to the use thereof and to composite materials or articles obtained from said fibers thus treated.

The first subject of the invention thus relates to a process for impregnating, in particular on line, rovings or ribbons of natural fibers, in particular of flax fibers, which comprises at least the following successive steps:

i) impregnating said rovings or said ribbons of said fibers by immersing in a bath containing a fine aqueous polymer dispersion or by spraying said aqueous dispersion, said impregnating being followed by ii) drying said rovings or said ribbons by means of a heating system, with, during said drying, the gradual elimination of the water and the melting of said polymer as said drying advances, the coating of said rovings or ribbons with said molten polymer incorporated into the core of the bundle of fibers of said rovings or of said ribbons binding said fibers to one another, iii) optionally, final forming of said rovings or ribbons thus treated, preferably in the form, which is flattened, of unidirectional ribbons or of rovings with a cylindrical cross section or in the form of pre-impregnated fabrics or in the form of an assembly of ribbons, in particular for producing preforms, iv) cooling said rovings or said ribbons thus treated, with said aqueous polymer dispersion comprising at least one amorphous or semi-crystalline polymer and, in the case of an amorphous polymer, said polymer having a Tg ranging from 50° C. to 175° C., preferably from 80° C. to 150° C., and, in the case of a semi-crystalline polymer, said polymer having a melting point ranging from 70° C. to less than 220° C., preferably greater than 90° C. and up to 190° C., more preferentially of from 100° C. to 170° C., said dispersion comprising a content by weight of said polymer ranging from 5% to 50% with particles in dispersion having a number-average size of less than 10 000 nm, preferably ranging from 50 to 5000 nm and more preferentially from 50 to 500 nm.

The polymer dispersion according to the invention is a dispersion of polymer particles that is fine through the limitation of the size of said particles, such that said particles easily diffuse to the core of the bundle of natural fibers in order to consolidate said fibers (bind them to one another).

Said dispersion, as meant according to the present invention, comprises both a dispersion of polymer dispersed using a dispersant or emulsifier or surfactant after it has been polymerized by any technique whatsoever, that will also be referred to as "post-emulsion", or self-dispersion without dispersant, emulsifier or surfactant through the presence of ionic functions or ionic function precursors, for example carboxylic acid functions neutralized in salt form, where the term "aqueous polymer dispersion" also encompasses a polymer emulsion or "polymer latex" obtained by a technique well known to those skilled in the art, such as the previous techniques of radical polymerization in emulsion in water from a monomer composition in emulsion using at least one surfactant.

Said aqueous dispersion can also be in a form diluted with water after it has been obtained and with the polymer content (also referred to as dry extract or solids content) maintained within the range defined according to the invention (5% to 50%).

More particularly, regarding the polymer of said dispersion, it is chosen from: (co)polyamides, (co)polyesters, polyurethanes, poly(meth)acrylates, fluoro polymers or polyolefins. The polymers of said dispersion, according to the invention, can be homopolymers or copolymers based on at least two monomers or repeating units or they can be blends of polymers compatible with one another. The term "compatible polymers" means miscible with one another, without phase separation.

According to one option of said process, said polymer is chosen from a poly(meth)acrylate, including in the form of (meth)acrylic copolymer, functionalized with acid functions, or chosen from a fluorinated polymer, including in the form of a fluorinated copolymer, in particular grafted with reactive functions, and said aqueous dispersion is an aqueous dispersion obtained by emulsion polymerization in the presence of a surfactant, said reactive functions (of said fluorinated polymer) being able to react with said natural fibers and more particularly with flax fibers.

Dispersions with poly(meth)acrylate polymer or (meth) acrylic copolymer will be referred to as acrylic dispersions or acrylic emulsions. According to the invention, unless otherwise specified, the term "acrylic" means, generally, both acrylic and/or methacrylic. As an example of an acrylic aqueous dispersion, mention may be made of the dispersion based on a copolymer of methyl methacrylate and of butyl acrylate and of acrylic acid.

As an example of a dispersion of fluoro polymer, mention may be made of aqueous dispersions of PVDF (polyvinylidene fluoride) or of copolymers of VDF with other olefins, in particular which are fluorinated. The surfactant can also be a fluorinated surfactant. As an example of a fluorinated surfactant, mention may be made of the ammonium salt of perfluorinated octanoic acid. The grafted fluorinated polymer can be obtained by grafting said fluorinated polymer with, for example, maleic anhydride.

According to another possibility, said polymer is a polyurethane formed from a polyisocyanate prepolymer comprising an ionic group, said prepolymer being dispersed in water with chain extension in an aqueous medium. In general, such a prepolymer is obtained by reacting a diol bearing a carboxylic acid or sulfonic acid function with a polyisocyanate, in particular diisocyanate, and optionally another diol without an ionic function, in an organic medium, in particular with a solvent that is easy to remove by evaporation. The dispersion in water is carried out after at least partial neutralization of said acid function with an inorganic base such as aqueous ammonia or an alkali metal hydroxide, or an organic base such as a tertiary amine. The chain extension can be carried out with a chain extender bearing functions that are reactive with the isocyanate functions of said prepolymer, for instance a diamine. The organic solvent can be removed by evaporation in order to recover the final aqueous dispersion of polyurethane, the dry extract of which can be adjusted by dilution in water.

According to another possibility, according to the invention, said polymer is dispersible or dispersed in powder form in an aqueous medium without surfactant, and preferably said polymer in powder form bears ionic groups or groups that are precursors of ionic groups, in particular by neutralization in water during the preparation of said dispersion.

In particular, said polymer is a copolyamide, preferably bearing sulfonic carboxy end groups or amine end groups, more preferentially having a content of said groups ranging from 50 to 500 µeq/g (microequivalents/g), in particular 100 to 250 µeq/g. According to one option, said copolyamide bears amine groups, preferably primary amine groups, neutralized in ammonium form by an acid, preferably a Bronsted acid, which is more preferentially phosphorus-comprising.

According to another option, said copolyamide bears carboxy groups neutralized in salt form by a base.

According to one particular option, the copolyamide is semi-crystalline and has a melting point of less than or equal to 150° C.

Said semi-crystalline copolyamide is a particularly preferred polymer option according to the present invention. Said copolyamide can comprise at least one of the following units: 5.9, 5.10, 5.12, 5.13, 5.14, 5.16, 5.18, 5.36, 6, 6.9, 6.10, 6.12, 6.13, 6.14, 6.16, 6.18, 6.36, 9, 10.6, 10.9, 10.10, 10.12, 10.13, 10.14, 10.16, 10.18, 10.36, 11, 12, 12.6, 12.9, 12.10, 12.12, 12.13, 12.14, 12.16, 12.18, 12.36, 6.6/6, 11/10.10 and mixtures thereof, and preferably comprises at least one unit among: 11, 12, 10.10, 6, 6.10, 6.12, 10.12, 6.14 and/or 6.6/6, 11/10.10 and mixtures thereof.

According to another possibility, said copolyamide can be chosen from: PA 6/6.6/12, PA 6/6.6/11/12, PA 6/12, PA 6.9/12, PA Pip.9/Pip.12/11, PA 6/IPD.6/12, PA IPD.9/12, PA6/MPMD.12/12, PA 6/6.12/12, PA 6/6.10/12, PA 6/Pip.12/12, PA 6/6.6/6.10/6.1, PA 6.10/Pip.10/Pip.12, PA 6/11/12, PA Pip.12/12, PA IPD.10/12, PA Pip.10/12, PA 6/11, PA Pip.10/11/Pip.9, PA 6/6.6/6.10, PA 6/6.10/6.12 and mixtures thereof. IPD is isophorone diamine and Pip is piperazine.

According to another possibility, said copolyamide can be semi-aromatic amorphous and is chosen from:

6.I, 8.I, 9.I, 10.I, 11.I, 12.I, 6.I/9.I, 9.I/10.I, 9.I/11.I, 9.I/12.I, 9/6.I, 10/6.I, 11/6.I, 12:6.I, 10/9.I, 10/10.I, 10/11.I, 10/12.I, 11/9.I, 11/10.I, 11/11.I, 11/12.I, 12/9.I, 12/10.I, 12/11.I, 12/12.I, 6.10/6.I, 6.12/6.I, 9.10/6.I, 9.12/6.I, 10.10/6.I, 10.12/6.I, 6.10/9.I, 6.12/9.I, 10.I/6.I, 10.I0/9.I, 10.12/9.I, 6.10/10.I, 6.12/10.I, 9.10/10.I, 9.12/10.I, 10.10/10.I, 10.12/10.I, 6.10/12.I, 6.12/12.I, 9.10/12.I, 9.12/12.I, 10.10/12.I, 11/6.I/9.I, 11/6.I/10.I, 11/6.I/11.I, 11/6.I/12.I, 11/9.I/10.I, 11/9.I/11.I, 11/9.I/12.I, 11/10.I/11.I, 11/10.I/12.I, 11/11.I/12.I, 6.I/10.I, 6.I/11.I, 6.I/12.I, 10.I/11.I, 10.I/12.I, 11.I/12.I, 12/6.I/10.I, 12/6.I/11.I, 12/6.I/12.I, 12/9.I/10.I, 12/9.I/11.I, 12.9.I/12.I, 12/10.I/11.I, 12/10.I12.I, 12/11.I/12.I, 12/11.I/12.I, the preceding terpolymer polyamides with 12/ replaced with 9/, 10/, 6.10/, 6.12/, 10.6/, 10.10/, 10.12/, 9.10/ and 9.12/, all the polyamides mentioned above, with isophthalic (I) partially replaced up to 40 mol % with terephthalic (T), naphthalene-2,6-dicarboxylic and/or with 1,3- or 1,4-CHDA (cyclohexanedicarboxylic acid), with all or some of the linear aliphatic diamines possibly being replaced with branched aliphatic diamines, preferably among trimethylhexamethylenediamine TMD, methylpentamethylenediamine MPMD, methyloctamethylenediamine (MOMD) or with cycloaliphatic diamines, preferably among BMACM, BACM and/or IPD or arylaliphatic diamines, preferably m- or p-xylylenediamines, all the polyamides mentioned above where isophthalic (I) is partially or totally replaced with a linear or branched $C_6$ to $C_{18}$ aliphatic diacid and at the same time with total or partial replacement of the aliphatic diamine with a cycloaliphatic diamine among BMACM, BACM and/or IPD.

BMACM is bis(3-methylaminocyclohexyl)methane, BACM is bis(aminocyclohexyl)-methane and IPD (or also denoted IPDA) is isophorone diamine.

More particularly, said polymer is semi-crystalline with a melting point Mp greater than 90° C., preferably of at least 100° C., and the particles of said dispersion have a number-average size ranging from 50 to 5000 nm, preferably from 50 to 500 nm. This particle size is measured according to the laser diffraction method (Coulter LS600) or by scanning electron microscope.

The glass transition temperature Tg of the polymers used is measured by means of a differential scanning calorimeter (DSC), after a second round of heating, according to standard ISO 11357-2. The heating and cooling rate is 20° C./min. The melting point Mp and the crystallization temperature Tc are measured by DSC, after a first heating operation, according to standard ISO 11357-3. The heating and cooling rate are 20° C./min.

With regard to the content by dry weight of said polymer relative to the dry weight of said fibers, it can range from 0.5% to less than 50%.

More particularly, said content by weight can range from 0.5% to 10% when said impregnation is limited to the consolidation of said fibers to one another, in addition to sizing. In the case of the consolidation of the fibers, their cohesion energy increases due to the binding of said fibers to one another at the core of the fiber bundle. In the case of sizing, the desired effect is different and is related to a compatibilization of said fibers with the polymer matrix of the composite by the interface created around the fibers with a specific polymer improving the compatibility of the fibers with the matrix for better adhesion of the fibers to the polymer matrix of the composite material.

According to one variant of the process of the invention, said polymer content is greater than 25% and less than 50% and preferably from 30% to 45% when said impregnation in addition to said consolidation results in a prepreg of said fibers, which is used or can be used separately or successively, i.e. successively to said impregnation, in the manufacture of composite materials.

Preferably, the viscosity of said dispersion at 23° C. ranges from 10 to 1000 mPa·s. The method used to measure viscosity is the Brookfield method (Brookfield viscosity according to ISO 2555).

According to one particular case, said polymer is biobased and in particular is a (co)polyamide based on biobased monomers. The term "copolyamide based on" means here that it comprises at least one biobased monomer. As examples of biobased polyamides, mention may be made of polyamides comprising PA11 or PA10.10 units.

Said natural fibers are preferably long fibers, in particular long flax fibers, with L/D>2000.

More particularly, said rovings or ribbons are based on flax fibers having a tex (linear weight expressed in tex) ranging from 10 to 10 000 and preferably from 100 to 4000 and more preferentially from 500 to 1500.

Said process according to the invention can comprise at least one additional series of steps of impregnating according to i) and of drying according to ii), after a first series of steps of impregnating according to i) and of drying according to ii), with, in the case where said polymer dispersion is different from that of the preceding series, i.e. different in terms of the nature of said polymer with said polymer remaining compatible with said polymer of the preceding series or different in terms of the content of said polymer which is the same, successive passes through a different immersion impregnation bath or through a spraying device with a different dispersion and through a different drying system. If not, in the case where said dispersion remains the same, passage in at least one loop in the same immersion impregnation bath or in the same spraying device and in the same drying system of the first series of steps.

According to another variant, the process according to the invention can comprise an additional step of impregnating and coating in the molten state, after said drying step ii), with a polymer in the molten state, said polymer being different than but compatible with said polymer of said aqueous dispersion and with said molten polymer preferably being deposited in the molten state by passing said rovings or said ribbons through an extruder die, with optionally, after cooling according to step iv), passing through a system for reducing the size of said fibers thus treated.

The immersion impregnating step i) can be carried out continuously or batchwise with a variable residence time in said immersion and impregnation bath that is adjustable according to the polymer content targeted, which means that, the shorter the residence time, the lower the polymer content relative to the dry weight of said fibers. It is possible to define a limiting residence time at the end of which the impregnated polymer content reaches a limit for a given impregnation temperature that can range from ambient temperature (20° C.) up to 70° C. More preferentially, said impregnation is carried out continuously and, in this case, the residence time will vary with the rate of passage through the immersion bath and the length of said immersion bath. Similarly, said impregnation can be carried out by spraying said aqueous dispersion in a spraying device comprising a spray, with said spraying possibly also being carried out continuously and the polymer content possibly being adjusted by the residence time in this spraying device, via the spray flow rate of said device and via the dry extract of said dispersion.

With regard to the drying step ii), said heating means of said step ii) can be chosen from: infrared radiation (IR), microwaves, induction or with an oven with water extraction, pulsed-air oven or by calendering on heating rolls. The cooling step enables final consolidation of the fibers, before optional winding of the rovings or ribbons thus treated. Finally, according to the invention, the rovings or ribbons are left to cool in order to finish the consolidation of the fibers, before optional winding.

More particularly, said process can comprise a step of forming said fibers in the shape of a ribbon with a width of less than 2000 mm, preferably less than 200 mm and in particular of between 3 and 50 mm.

Indeed, depending on the final use of the roving or of the ribbon, a calibration die can be used in said process, which die conforms or calibrates said ribbon or roving to the dimensions desired for said use.

According to one advantageous option, said process as defined above can be continuously integrated into a composite material production line. This line can thus comprise a line for impregnation and consolidation of said reinforcing fibers, according to the process of the invention, continuously feeding the fibrous reinforcement in the manufacture of composite materials.

Another subject covered by the invention relates to the impregnated natural fibers, in particular impregnated flax fibers, as obtained or which can be obtained by means of an impregnation process as defined above according to the invention.

More particularly, they comprise, as consolidation binder at the core of the bundle of said fibers (binding said fibers to one another), the polymer as defined in the dispersions according to the invention, in particular the semi-crystalline copolyamide as defined above and preferably at a content by dry weight of polymer relative to said fibers+polymer ranging from 0.5% to 10%.

These fibers thus treated can thus be used as reinforcing fibers for composites, in particular for thermoplastic composites, preferably for a polyamide thermoplastic matrix, more preferentially for a polyamide matrix based on PA 11, PA10.10 and PA 6.10 and PA 10.1/6.1.

These fibers can also be in the form of monodirectional (unidirectionnel or UD) or bidirectional or 3D (including multiaxial), woven or nonwoven, fiber assemblies or in the form of preforms.

Another subject of the invention relates to the use of the fibers obtained by means of the process as defined above or of the fibers as defined above, in the manufacture of parts made of composite materials with a fibrous reinforcement based on said fibers and a polymer matrix based on a thermoplastic or thermosetting polymer, in particular compatible with said polymer of said aqueous dispersion.

The invention also covers composite materials reinforced with natural fibers which comprise fibers obtained by means of said process of the fibers as defined above.

Finally, the invention covers final products which are articles, in particular molded parts, reinforced with natural fibers, where said fibers are obtained by means of said process or are as defined above.

BRIEF DESCRIPTION OF THE DRAWINGS

FIG. 1. Flax roving is glued (with Loctite° 401 glue) onto a cardboard frame.

The following examples are presented by way of illustration of the invention and of the performance levels thereof and in no way limit the scope thereof.

1—EXAMPLES

In order to carry out the impregnation treatment with an aqueous solution of copolyamide, 10 l of several solutions (aqueous dispersions of copolyamide) were produced in a laboratory reactor.

The copolyamides used are the Arkema commercial products Platamid® 2592 and Platamid® 1657.

Their essential characteristics are presented in Table I below.

TABLE I

| Platamid ® | Melting point | COOH functionality (µeq/g) |
|---|---|---|
| 2592 | 102 | 220 |
| 1657 | 107 | 180 |

These products were introduced in dry powder form into a solution of water with sodium hydroxide (1% relative to the Platamid®). The final dry extract (DE) is 30%.

The reagents are charged to the reactor, and then the medium is inerted with nitrogen. The reagents are heated so as to reach the material temperature of 150° C. This heating phase is carried out with stirring at 1000 rpm. Between 100 and 120° C., the medium becomes homogeneous, white and opaque. The medium is kept stirring at 1000 rpm for 30 min at 150° C., then cooled with stirring at 300 rpm. The dispersions obtained are fluid, white and opaque.

The particle size (size of the particles) of the powders was measured by means of observations made by scanning electron microscopy and also using the laser diffraction particle size analysis method. The 2 types of measurements are in agreement. The data indicated in the table below were obtained with the laser diffraction particle size analysis method.

The particle size, the viscosity and the dry extract of the dispersions used are presented in Table II below.

TABLE II

| Test REF | Platamid ® of the dispersion | Number-average diameter of the particles (nm) | Brookfield* viscosity at 23° C. (mPa · s) | Dispersion dry extract (%) |
|---|---|---|---|---|
| EP-063 | Platamid ® 2592 | 80 | 30 | 30 |
| EP-064 | Platamid ® 1657 | 140 | 20 | 30 |

*the measurement was carried out with a No. 1 spindle at 60 rpm.

These aqueous dispersions thus prepared were then used on the flax fiber treatment line, in non-diluted or diluted form.

Except for Example 7, in which the impregnation method is specified, in all the other cases (unless specifically specified for each example), said impregnation was carried out by on line (continuous) spraying using a spraying device (spray) with a residence time in the jet of said spray of approximately 1 s. The drying is carried out by heating with an IR device. The cooling is carried out in the open air.

The 1$^{st}$ series of tests was carried out on a flax roving (of fibers) of high count or grammage of 2190 tex, with various treatments:

Counter Example 1: non-impregnated roving of 2190 tex
Example 1: EP-063 ND: impregnation with a non-diluted solution (DE: 30%) of Platamid® 2592.
Example 2: EP-063 D50: impregnation with a dispersion, diluted to 50%, of Platamid® 2592 (DE: 15%).
Example 3: EP-064 ND: impregnation with a non-diluted dispersion of Platamid® 1657 (DE: 30%).
Example 4: EP-064 D50: impregnation with a dispersion, diluted to 50%, of Platamid® 1657 (DE: 15%).

The 2$^{nd}$ series of tests was carried out on a flax roving of low count (1030 tex) having undergone a treatment with Platamid® 1657, at various degrees of impregnation.

Counter Example 2: non-impregnated roving of low count (0% polymer).
Example 5: impregnation with a 4-fold diluted solution with DE: 7.5%.
Example 6: impregnation twice successively (2 passes) with the dispersion of Example 5.
Example 7: impregnation by immersion (dipping) in the aqueous dispersion with a longer residence time (10 s).

2—TENSILE MECHANICAL PROPERTIES 2.1—Test Conditions
Non-conditioned samples
Temperature: 23° C.

The flax roving is glued (with Loctite® 401 glue) onto a cardboard frame (according to FIG. 1). The reference length L0 was chosen at 14 mm, in the knowledge that the average length of a flax fiber is approximately 30 mm. The upper and lower edges of the cardboard are held tight between the jaws of the dynamometer (Zwick machine) while the side edges are cut. The roving is then subjected to a tensile force at a speed of 1 mm/min (displacement of the crosshead).

2.2—Results

In order to compare the rovings weakly impregnated with resin (up to 10% of polymer), the breaking force of the various samples tested is measured. The results are presented in Table III below.

TABLE III

| Reference | Counter Example 1 | Example 1 | Example 2 | Example 3 | Example 4 |
|---|---|---|---|---|---|
| Impregnation type | Non-impregnated | EP63-ND | EP63-D50 | EP64-ND | EP64-D50 |
| Resin content (% by weight) | 0 | 2-10% | 2-10% | 2-10% | 2-10% |
| Number of samples | 5 | 8 | 5 | 5 | 5 |
| Mean breaking force (N) | 443 | 775 | 723 | 888 | 770 |
| Standard deviation | 33 | 98 | 68 | 23 | 73 |

It is shown in Table III that the impregnation with a copolyamide dispersion makes it possible to very significantly increase the breaking force of the flax fiber roving.

The two dispersions give results that are similar and along the lines of a consolidation (Examples 2 and 3 as opposed to Counter Example 1), thereby demonstrating that the consolidation dispersion proposed functions, including for dilutions of 50% (which corresponds to a dry extract of 15%).

Table IV below gives the result of the various impregnations with Platamid® 1657 and a roving of low grammage or count (1030 tex). It is noted that, with a 4-fold dilution with a final dry extract of 7.5%, a breaking force is obtained that is equivalent to that obtained with the non-impregnated roving of high count (2190 tex) (comparison of Example 5 with Counter Example 1): it has thus been demonstrated that the use of a copolyamide dispersion as defined above makes it possible to use a flax fiber roving that has half the count of the initial roving (1030 tex compared with 2190 tex), while at the same time retaining approximately the same mechanical strength (approximately the same breaking force).

It is also shown that, by performing several impregnation passes (by spraying) with the same dispersion, the copolyamide content in the final roving is increased (comparison between Examples 5 and 6).

To finish, it is shown, by means of an immersion (dipping) impregnation test with a much longer spraying time (10 s), that it is possible to impregnate the roving with close to 40% (by weight) of copolyamide (Example 7). This content corresponds to a resin (polymer) content found in usual pre-impregnated reinforcements, making it possible to thus directly produce composite parts, for example by thermocompression, without an additional operation of impregnating the fibrous reinforcement.

The possibility, with the process according to the invention, of directly producing a composite semi-product of prepreg type that is ready to use is thus demonstrated.

TABLE IV

| Reference | Counter Example 2 | Example 5 | Example 6 | Example 7 |
|---|---|---|---|---|
| Impregnation type | Non-impregnated | Product diluted 4-fold (DE: 7.5%) | Product diluted 4-fold (DE: 7.5%) with 2 passes | Immersion impregnation for 10 s |
| Polymer content (% by weight/ fiber + polymer) | 0 | 2.7 | 5.3 | 39.8 |
| Number of samples | 5 | 5 | 5 | 3 |
| Mean breaking force (N) | 202 | 449 | 549 | 948 |
| Standard deviation | 15 | 49 | 65 | 49 |

The invention claimed is:

1. A process for impregnating, on line, rovings or ribbons of natural fibers, wherein the process comprises at least the following successive steps:
   i) impregnating said rovings or said ribbons of said fibers by immersing in a bath containing a fine aqueous polymer dispersion or by spraying said aqueous dispersion, said impregnating being followed by
   ii) drying said rovings or said ribbons by means of a heating system, with, during said drying, the gradual elimination of the water and the melting of said polymer as said drying advances, the coating of said rovings or ribbons with said molten polymer incorporated into the core of the bundle of fibers of said rovings or of said ribbons binding said fibers to one another,
   iii) optionally, final forming of said rovings or ribbons thus treated, of unidirectional ribbons or of rovings with a cylindrical cross section or in the form of pre-impregnated fabrics or in the form of an assembly of ribbons,
   iv) cooling said rovings or said ribbons thus treated,
   with said aqueous polymer dispersion comprising at least one amorphous or semi-crystalline polymer and, in the case of an amorphous polymer, said polymer having a Tg ranging from 50° C. to 175° C., and, in the case of a semi-crystalline polymer, said polymer having a melting point ranging from 70° C. to less than 220° C., said dispersion comprising a content by weight of said polymer ranging from 5% to 50% with particles in dispersion having a number-average size of less than 10 000 nm, wherein said polymer is a polyurethane formed from a polyisocyanate prepolymer comprising an ionic group, dispersed in water with chain extension in an aqueous medium or a copolyamide.

2. The process of claim 1, wherein said polymer is dispersible (or dispersed) in powder form in an aqueous medium without surfactant.

3. The process of claim 1, wherein said copolyamide bears amine groups.

4. The process of claim 1, wherein said copolyamide bears carboxy groups which are neutralized in salt form by a base.

5. The process of claim 1, wherein said copolyamide is semi-crystalline with a melting point of less than or equal to 150° C.

6. The process of claim 1, wherein said copolyamide comprises at least one of the following units: 5.9, 5.10, 5.12, 5.13, 5.14, 5.16, 5.18, 5.36, 6, 6.9, 6.10, 6.12, 6.13, 6.14, 6.16, 6.18, 6.36, 9, 10.6, 10.9, 10.10, 10.12, 10.13, 10.14, 10.16, 10.18, 10.36, 11, 12, 12.6, 12.9, 12.10, 12.12, 12.13, 12.14, 12.16, 12.18, 12.36, 6.6/6, 11/10.10 and mixtures thereof.

7. The process of claim 1, wherein said polymer is a copolyamide chosen from: PA 6/6.6/12, PA 6/6.6/11/12, PA 6/12, PA 6.9/12, PA Pip.9/Pip.12/11, PA 6/1PD.6/12, PA IPD.9/12, PA6/MPMD.12/12, PA 6/6.12/12, PA 6/6.10/12, PA 6/Pip.12/12, PA 6/6.6/6.10/6.I, PA 6.10/Pip.10/Pip.12, PA 6/11/12, PA Pip.12/12, PA IPD.10/12, PA Pip.10/12, PA 6/11, PA Pip.10/11/Pip.9, PA 6/6.6/6.10, PA 6/6.10/6.12 and mixtures thereof.

8. The process of claim 1, wherein said polyamide is semi-aromatic amorphous and corresponds to the following formulae:
   6.I, 8.I, 9.I, 10.I, 11.I, 12.I, 6.I/9.I, 9.I/10.I, 9.I/11.I, 9.I/12.I, 9/6.I, 10/6.I, 11/6.I, 12:6.I, 10/9.I, 10/10.I, 10/11.I, 10/12.I, 11/9.I, 11/10.I, 11/11.I, 11/12.I, 12/9.I, 12/10.I, 12/11.I, 12/12.I, 6.10/6.I, 6.12/6.I, 9.10/6.I, 9.12/6.I, 10.10/6.I, 10.12/6.I, 6.10/9.I, 6.12/9.I, 10.I/6.I, 10.10/9.I, 10.12/9.I, 6.10/10.I, 6.12/10.I, 9.10/10.I, 9.12/10.I, 10.10/10.I, 10.12/10.I, 6.10/12.I, 6.12/12.I, 9.10/12.I, 9.12/12.I, 10.10/12.I, 11/6.I/9.I, 11/6.I/10.I, 11/6.I/11.I, 11/6.I/12.I, 11/9.I/10.I, 11/9.I/11.I, 11/9.I/12.I, 11/10.I/11.I, 11/10.I/12.I, 11/11.I/12.I, 6.I/10.I, 6.I/11.I, 6.I/12.I, 10.I/11.I, 10.I/12.I, 11.I/12.I, 12/6.I/10.I, 12/6.I/11.I, 12/6.I/12.I, 12/9.I/10.I, 12/9.I/11.I, 12.9.I/12.I, 12/10.I/11.I, 12/10.I12.I, 12/11.I/12.I, 12/11.I/12.I,
   the preceding terpolymer polyamides with 12/ replaced with 9/, 10/, 6.10/, 6.12/, 10.6/, 10.10/, 10.12/, 9.10/ and 9.12/,
   all the preceding polyamides, with isophthalic (I) partially replaced up to 40 mol % with terephthalic (T), naphthalene-2,6-dicarboxylic and/or with 1,3- or 1,4-CHDA (cyclohexanedicarboxylic acid), with all or some of the linear aliphatic diamines possibly being replaced with branched aliphatic diamines,
   all the preceding polyamides, wherein isophthalic (I) is partially or totally replaced with a linear or branched C6 to C18 aliphatic diacid and at the same time with total or partial replacement of the aliphatic diamine with a cycloaliphatic diamine among BMACM, BACM and/or IPD.

9. The process of claim 1, wherein said polymer is semi-crystalline with a melting point Mp greater than 90° C., and wherein the particles of said dispersion have a number-average size ranging from 50 to 5000 nm.

10. The process of claim 1, wherein the content by dry weight of said polymer relative to the dry weight of said fibers ranges from 0.5% to less than 50%.

11. The process of claim 10, wherein said content by weight ranges from 0.5% to 10%, and wherein said impregnation is limited to the consolidation of said fibers to one another, in addition to sizing.

12. The process of claim 10, wherein said content is greater than 25% and less than 50%, and wherein said impregnation in addition to said consolidation results in a prepreg of said fibers that is used or can be used separately or successively in the manufacture of composite materials.

13. The process of claim 1, wherein the viscosity of said dispersion at 23° C. ranges from 10 to 1000 mPa·s.

14. The process of claim 1, wherein said polymer is biobased.

15. The process of claim 1, wherein said fibers are long flax fibers with L/D>2000.

16. The process of claim 1, wherein said rovings or ribbons are based on flax fibers having a tex ranging from 10 to 10 000.

17. The process of claim 1, wherein the process comprises at least one additional series of steps of impregnating according to i) and of drying according to ii) after a first series of steps of impregnating according to i) and of drying according to ii), with a polymer dispersion different than that of the preceding series.

18. The process of claim 1, wherein the process comprises at least one additional series of steps of impregnating according to i) and of drying according to ii) after a first series of steps of impregnating according to i) and of drying according to ii), wherein said dispersion remains the same, passing in at least one loop in the same impregnation bath or in the same spraying device and in the same drying system of the first series of steps.

19. The process of claim 11, wherein the process further comprises an additional step of impregnating and of coating in the molten state, after said drying step ii), with a polymer in the molten state, said polymer being different than but compatible with said polymer of said aqueous dispersion and said polymer is deposited in the molten state by passing said rovings or said ribbons through an extruder die, with optionally, after cooling according to step iv), passing through a system for reducing the size of said fibers thus treated.

20. The process of claim 1, wherein said heating means of said drying step ii) are chosen from: infrared (IR) radiation, microwaves, induction or by an oven with water extraction, pulsed-air oven or by calendering on heating rolls.

21. The process of claim 1, wherein said process comprises a step of forming said fibers in the shape of a ribbon with a width of less than 2000 mm.

22. The process of claim 1, wherein the process is continuously integrated into a composite material manufacturing line.

* * * * *